United States Patent [19]

Albrecht

[11] Patent Number: 5,928,782

[45] Date of Patent: Jul. 27, 1999

[54] HOT MELT ADHESIVES WITH EXCELLENT HEAT RESISTANCE

[75] Inventor: Steven W. Albrecht, Forest Lake, Minn.

[73] Assignee: H.B. Fuller Licensing & Financing, Inc., St. Paul, Minn.

[21] Appl. No.: 08/749,443

[22] Filed: Nov. 15, 1996

[51] Int. Cl.⁶ ........................................... C09J 7/02
[52] U.S. Cl. ............................. 428/355 EN; 428/355 AC; 524/272; 524/275; 524/277; 524/487; 524/489; 524/502; 524/514; 524/515; 524/523
[58] Field of Search ....................... 428/355 AC, 355 EN; 524/272, 275, 277, 487, 489, 502, 514, 515, 523

[56] References Cited

U.S. PATENT DOCUMENTS

| | | |
|---|---|---|
| 4,816,306 | 3/1989 | Brady et al. . |
| 4,874,804 | 10/1989 | Brady et al. . |
| 5,331,033 | 7/1994 | Stauffer et al. . |
| 5,500,472 | 3/1996 | Liedermooy et al. . |

FOREIGN PATENT DOCUMENTS 0 721 006 A1  of 0000  European Pat. Off. .

*Primary Examiner*—Jenna Davis
*Attorney, Agent, or Firm*—Nancy N. Quan; Lisa L. Ryan

[57] ABSTRACT

A hot melt useful for packaging, comprising from about 10% to about 30% by weight of at least one copolymer of ethylene and methyl acrylate (both acrylates and methacrylates); from about 10% to about 20% by weight of at least one copolymer of ethylene and n-butyl acrylate (both acrylates and methacrylates), wherein the total polymer content does not exceed 40% by weight, and the total ethylene n-butyl acrylate copolymer content does not exceed the total ethylene methyl acrylate copolymer content by percent weight in the adhesive; from about 20% to about 60% by weight of at least one tackifying resin selected from the group consisting of rosins and modified rosins and hydrogenated derivatives; aliphatic, cycloaliphatic and aromatic hydrocarbon resins and modified hydrocarbon resins and hydrogenated derivatives; terpenes and modified terpenes and hydrogenated derivatives; and mixtures thereof; from about 5% to about 30% by weight of at least one wax; and up to about 2% by weight of an antioxidant; wherein the resultant adhesive has peel values greater than about 150° F. (about 65° C.).

20 Claims, No Drawings

HOT MELT ADHESIVES WITH EXCELLENT HEAT RESISTANCE

FIELD OF THE INVENTION

This invention relates to a hot melt adhesive based on a blend of a copolymer of ethylene methyl (meth)acrylate copolymer and a copolymer of ethylene and n-butyl (meth) acrylate which exhibits superior heat resistance and maintains superior bonding performance.

BACKGROUND OF THE INVENTION

Hot melt adhesives are widely used in the packaging industry for various applications. The most common applications are for case and carton sealing, and for tray forming. Such applications require resistance to fluctuations in temperature, especially for shipping packages from location to location. It is highly unacceptable for adhered packages to open because the adhesive either lacks cold temperature resistance and becomes brittle, or lacks high temperature resistance and softens. Brittleness will cause a shattering of the adhesive at the bond line and subsequent lack of fiber tear. As an adhesive softens with increased temperature, it may lack the green strength to sufficiently hold the flaps of a carton or case together, and the flaps "spring back."

In achieving high temperature resistance, cold temperature resistance is often sacrificed and the converse is also true. As high temperature resistance is increased, the products have a shorter open time resulting in less time for bonding, and also in decreased bondability due to the fact that there is less time for penetration into the substrate. Increasing high temperature resistance leads to more brittle products because the weight percent of the higher melting components, such as wax and tackifying resins with melting points of greater than 100° C., are increased. The brittleness in turn causes decreased cold temperature resistance. It is therefore desirable to have products with high heat resistance that remain flexible enough for good cold temperature resistance, as well as a longer open time.

U.S. Pat. Nos. 4,816,306 issued Mar. 28, 1989 and 4,874,804 issued Oct. 17, 1989 to Brady et al. teach hot melt packaging adhesives based on ethylene n-butyl acrylate copolymers with terpene phenolic tackifying resins and synthetic high melting point wax. It is stated that this combination of components provide adhesives characterized by an excellent balance of high and low temperature performance without sacrificing machinability or thermal stability. There is no statement or suggestion that copolymers of ethylene and methyl acrylate may be used.

U.S. Pat. No. 5,331,033 issued Jul. 19, 1994 to Stauffer et al. also teach hot melt packaging adhesives based on ethylene n-butyl acrylate with aliphatic or cycloaliphatic or aromatic hydrocarbon resins or hydrogenated derivatives thereof, and a synthetic high melting point wax. It is also stated in this patent that the adhesives are characterized by an excellent balance of high and low temperature performance without sacrificing machinability or thermal stability. Again, these inventors did not contemplate the use of copolymers of ethylene and methyl acrylate.

U.S. Pat. No. 5,500,472 to Liedermooy et al. issued Mar. 19, 1996 teaches a hot melt adhesive based on an ethylene n-butyl acrylate copolymer with a terpene phenolic tackifying resin and a low melting point synthetic Fischer-Tropsch wax. It is suggested that small amounts, up to 20%, of other polymeric additives may be added including ethylene methyl acrylate copolymers in a list of others. This patent teaches adhesives with adjusted peel values of 130® (about 54.5° C.) or less. The adjusted peel value indicates that some of the samples tested have fallen with the 10° F. (5.5° C.) increment as the temperature was being adjusted. These adhesives do not have superior heat resistance.

European Patent Application EP 0,721,006A1 published Jul. 10, 1996 teaches a hot melt packaging adhesive based on ethylene n-butyl acrylate copolymers having a melt index of at least 850 g/10 minutes combined with a rosin ester tackifying resin and a microcrystalline or paraffin wax, which may also contain ethylene vinyl acetate copolymers, ethylene methyl acrylate copolymers, ethylene acrylic acid copolymers, polyethylene, polypropylene, poly-(butene-1-co-ethylene), and lower melt index ethylene n-butyl acrylate copolymers as a non-essential ingredient. These adhesives tear fiber in the range of—35° C. to 40° C. The resultant adhesives are freezer grade adhesives having a slow rate of set and low peel values. The examples show adjusted peel values of 100° F. (about 38° C.). The adjusted peel values indicate that the sample failed in the 10° F. (about 5.5° C.) increments when the temperature was being adjusted. Even though this patent teaches ethylene methyl acrylate copolymers as one of many optional polymers that could be used, the patent also teaches that these formulations do not have high heat resistance, or formulations that have only cold resistance.

The present inventors have found a hot melt adhesive based on copolymers of ethylene and methyl (meth)acrylate which surprisingly have superior heat resistance over conventional packaging hot melt adhesives while maintaining a long open time and excellent flexibility and cold temperature resistance.

SUMMARY OF THE INVENTION

The present invention relates to a hot melt packaging adhesive comprising a) from about 10% to about 30% by weight of at least one copolymer of ethylene and methyl (meth) acrylate; b) from about 10% to about 20% by weight of at least one copolymer of ethylene and n-butyl (meth) acrylate, wherein the total polymer content does not exceed about 45% by weight in the adhesive, and the total ethylene methyl (meth)acrylate copolymer content does not exceed the total ethylene n-butyl (meth)acrylate copolymer content by weight in the adhesive; c) from about 20% to about 60% by weight of at least one tackifying resin including rosins and modified rosins and hydrogenated derivatives; aliphatic, cycloaliphatic and aromatic hydrocarbons and modified hydrocarbons and hydrogenated derivatives; terpenes and modified terpenes and hydrogenated derivatives and mixtures thereof; d) between about 5% and about 30% by weight of at least one wax; and e) up to about 2% of an antioxidant.

The resultant adhesives are characterized by peel values of greater than about 150° F. (about 65° C.), long open times as characterized by high fiber tearing bonds with an open time of about 7 seconds, and high fiber tearing bonds at cold temperatures.

These adhesives are further characterized by viscosities of less than about 2,000 cPs at 175° C. and specific gravities of less than about 1.00 at about 23° C.

These adhesives can be used in all types of extrusion packaging operations where paper and paperboard are used such as virgin and recycled kraft, high and low density kraft, chipboard, corrugated cases, and various other types of treated and coated kraft and chipboard.

These adhesives may be applied using piston pump or gear pump extrusion equipment, or wheel applicators. Such equipment is manufactured by Nordson, ITW or Slautterback. Recommended application temperatures are less than about 175° C.

(Meth)acrylates as used herein denotes both acrylates and methacrylates.

DETAILED DESCRIPTIONS OF THE PREFERRED EMBODIMENTS

The copolymers of ethylene and methyl (meth)acrylate useful herein are those having from about 10% to about 40% by weight methyl (meth)acrylate, preferably from about 15% to about 30% by weight, and most preferably from about 20% to about 30% by weight, and a melt index of less than about 1500 g/10 min., preferably less than about 1000 g/10 min. and most preferably less than about 500 g/10 min. Polymers with lower melt indices provide better heat resistance and better tensile strength provided a low enough viscosity is maintained. These copolymers are available from Exxon Chemical Co. under the tradename of Optema™. Some available grades are TC-140, XS-93.04 and TC-221. They are also available from Elf Atochem North America under the tradename of Lotryl™. Some available grades are 9 MA 02, 14 MG 02, 15 MA 03, 16 MA 003, 18 MA 02, 18 MG 02, 20 MA 08/20 MB 08, 24 MA 005, 28 MA 07, 28 MA 175, 29 MA 03 and 35 MA 05. Other sources include Quantum Chemical Co., U.S.I. Division under the tradename of Acrythene™ and Chevron under the tradename Emac™. One such grade is SP 2220 which has 20% by weight methyl acrylate and a melt index of 20 g/10 min. Even though acrylates are preferred, methacrylate copolymers are also contemplated for use in this invention. These copolymers are useful in amounts from about 10% to about 30% by weight in the adhesive, preferably from about 15% to about 30% by weight and most preferably from about 20% to about 25% by weight in the adhesive.

The copolymers of ethylene and n-butyl (meth)acrylate useful herein are those containing from about 10% to about 40%, preferably from about 20% to about 40% by weight, and most preferably from about 30% to about 40% by weight n-butyl (meth)acrylate and having a melt index of less than about 2500 g/10 min., preferably less than about 1500 g/10 min., and most preferably less than about 1000 g/10 min. The lower melt indices are preferred for increased heat resistance, improved flexibility and improved tensile strength. It is also preferred to maintain low viscosities. These copolymers are available from Quantum Chemical Co., U.S.I. Division in Cincinnati, Ohio under the tradename Enathene™. Some available grades are EA80808, EA89821, EA89822. They are also available from Elf Atochem North America in Philadelphia, Pa. under the tradename Lotryl™. Some available grades are 7 BA 01, 10 BA 175, 14 BA 04, 17 BG 04, 17 BA 07, 28 BA 175, 30 BA 02, 35 BA 40, 35 BA 320, 35 BA 900 and 35 BA 1000. Preferable grades are 35 BA 320, 35 BA 900 and 35 BA 1000 with an n-butyl acrylate content of 35% by weight and a melt index of 320 g/10 min, 900 g/10 min. and 1000 g/10 min. They are also available from Exxon Chemical Co. in Houston, Tex. under the tradename of Escorene™. Two available grades are XW-23.AH and XW-22. These copolymers are useful from about 10% to about 20% by weight, preferably from about 12% to about 18% by weight, and most preferably from about 14% to about 17% by weight in the adhesive.

The tackifying resins useful herein may include aliphatic, cycloaliphatic and aromatic hydrocarbons and modified versions and hydrogenated derivatives thereof; and terpenes and modified terpenes and hydrogenated derivatives thereof; and rosins and modified rosins and hydrogenated derivatives and mixtures thereof. These tackifying resins have a ring and ball softening point of between about 70° C. and 150° C. They are also available with differing levels of hydrogenation, or saturation which is another commonly used term. Useful examples include Eastotac™ H-100, H-115 and H-130 from Eastman Chemical Co. in Kingsport, Tenn. which are partially hydrogenated cycloaliphatic petroleum hydrocarbon resins with different softening points. These are available in the E grade, the R grade, the L grade and the W grade. These have differing levels of hydrogenation from least hydrogenated (E) to most hydrogenated (W). The E grade has a bromine number of 15, the R grade a bromine number of 5, the L grade has a bromine number of 3 and the W grade a bromine number of 1. There is also an Eastotac™ H-142R resin available. Other useful tackifying resins include Escorez™ 5300 and Escorez™ 5400, partially hydrogenated cycloaliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra which is an aliphatic, aromatic petroleum hydrocarbon resin available from Goodyear Chemical Co. in Akron, Ohio; Hercolite™ 2100 which is a partially hydrogenated cycloaliphatic petroleum hydrocarbon resin available from Hercules in Wilmington, Del.; and Zonatac™ 105 Lite which is a styrenated terpene resin made from d-limonene and available from Arizona Chemical Co. in Panama City, Fla. There are numerous types of rosins and modified rosins available with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Commercially available grades include, but are not limited to, Sylvatac™ 1103, a pentaerythritol rosin ester available from Arizona Chemical Co., Unitac R-100 Lite a pentaerythritol rosin ester from Union Camp in Wayne, N.J., Permalyn™ 305, a erythritol modified wood rosin available from Hercules, Inc. in Wilmington, Del. and Foral 105, which is a highly hydrogenated pentaerythritol rosin ester available. Sylvatac R-85 which is an 85° C. melt point rosin acid and Sylvatac 295 which is a 95° C. melt point rosin acid are both available from Arizona Chemical Co. Foral AX is a 75° C. melt point hydrogenated rosin acid available from Hercules Inc. Nirez V-2040 is a phenolic modified terpene resin available from Arizona Chemical Co. There are many available types and grades of tackifying resins available from many companies, and one skilled in the art would recognize that this is not an exclusive list, and that the available tackifying resins are too numerous to list here. These tackifiers are useful from about 20% to about 60% by weight, preferably from about 30% to about 50% by weight and most preferably from about 35% to about 50% by weight in the adhesive.

The waxes useful herein may include paraffin waxes, microcrystalline waxes, high density low molecular weight polyethylene waxes, by-product polyethylene waxes, Fischer-Tropsch waxes, oxidized Fischer-Tropsch waxes, and hydroxy stearamide waxes. Other functional waxes are available as well as other fatty amide waxes. It is common in the art to use the terminology synthetic high melting point waxes which includes high density low molecular weight polyethylene waxes, by-product polyethylene waxes, and Fischer-Tropsch waxes.

The paraffin waxes useful herein are those having a Ring and Ball softening point of about 55° C. to about 85° C. The preferred waxes are Okerin™ 236TP available from Astor Wax Corporation located in Doraville, Ga.; Penreco™ 4913 available from Pennzoil Products Co. in Houston, Tex.; R-7152 Paraffin Wax available from Moore & Munger in Shelton, Conn.; and Paraffin Wax 1297 available from International Waxes, Ltd in Ontario, Canada.

The microcrystalline waxes useful herein are those having about 50% by weight or more cyclo or branched alkanes with a length of between about 30 and 100 carbons. They are generally less crystalline than paraffin and polyethylene waxes, and have melting points of greater than about 70° C. Examples include Victory™ Amber Wax, a 70° C. melting point wax available from Petrolite Corp. located in Tulsa, Okla.; Bareco™ ES-796 Amber Wax, a 70° C. melt point wax available from Bareco in Chicago, Ill.; Okerin™ 177, an 80° C. melt point wax available from Astor Wax Corp.; Besquare™ 175 Amber Wax, an 80° C. melt point microcrystalline wax, Be Square™ 195 Amber Wax, a 90° C. melt point wax all available from Petrolite Corp.; Indramic™ 91, a 90° C. melt point wax available from Industrial Raw Materials located in Smethport, Pa.; and Petrowax™ 9508 Light, a 90° C. melt point wax available from Petrowax Pa., Inc. located in New York, N.Y.

The synthetic high melting point waxes useful herein are high density, low molecular weight polyethylene waxes, by-product polyethylene waxes and Fischer-Tropsch waxes. Preferred waxes include Petrolite™ C-4040, Polywax™ 1000, 2000 and 3000, low molecular weight polyethylene waxes available from Petrolite Corp.; Escomer™ H-101, a modified polyethylene wax available from Exxon Chemical Co.; Marcus 100, 200 and 300, low molecular weight by-product polyethylene waxes available from Marcus Chemical Co., a Division of H.R.D. Corp. located in Houston, Tex.; and Paraflint™ H-1, H-4 and H-8, Fischer-Tropsch waxes available from Sasol-SA/Moore & Munger in Shelton, Conn. The waxes are useful in amounts from about 5% to about 30% by weight, preferably from about 10% to about 25% by weight and most preferably from about 15% to about 20% by weight in the adhesive, and may be used in any combination. One skilled in the art would recognize that different amounts of a wax will be used depending on the type of wax and the specific application, and that different combinations of waxes will also affect the amount of wax desired.

Solid plasticizers such as Benzoflex™ 352, a 1,4-cyclohexane dimethanol dibenzoate, Benzoflex™ S-404, a glycerol tribenzoate, and Benzoflex™ 552, a pentaerythritol tetrabenzoate all available from Velsicol Chemical Corp. in Rosemont, Ill. may be optionally utilized to obtain even longer open times and lower viscosities which improves penetration into the substrates, improved adhesion and improved cold temperature flexibility. These solid plasticizers may be used in amounts up to about 20% by weight in the adhesive. Such plasticizers do not have a detrimental effect on heat resistance as liquid plasticizers often do.

A stabilizer or antioxidant is also preferably used in hot melt adhesives. These compounds are added to protect the adhesive from degradation caused by reaction with oxygen which is induced by such things as heat, light or residual catalyst from the raw materials, for example from the tackifying resin. Such antioxidants are commercially available from Ciba-Geigy located in Hawthorne, N.Y. and include Irganox™ 565, 1010 and 1076 which are hindered phenolic antioxidants. These are primary antioxidants which act as free radical scavengers and may be used alone or in combination with other antioxidants such as phosphite antioxidants like Irgafos™ 168 available from Ciba-Geigy. Phosphite antioxidants are considered secondary antioxidants, are not generally used alone, and are primarily used as peroxide decomposers. Other available antioxidants are Cyanox™ LTDP available from Cytec Industries in Stamford, Conn., and Ethanox™ 1330 available from Albemarle Corp. in Baton Rouge, La. Many other antioxidants are available for use by themselves, or in combination with other such antioxidants. These compounds are added to the hot melts in small amounts and have no effect on the other physical properties. Other compounds that could be added are pigments which add color or fluorescing agents, to mention only a couple. Additives like these are known to those skilled in the art.

Surprisingly, these adhesives are characterized by peel values of greater than about 150° F. (about 65° C.) defining excellent heat resistance, as well as excellent cold temperature resistance as exhibited by full fiber tearing bonds in the freezer, excellent flexibility and long open times as characterized by high fiber tearing bonds with an open time as long as 7 seconds. The longer open times achieved with these adhesives allow an adhesive to stay "open" longer resulting in increased penetration into the substrates and improved bondability. The longer an adhesive stays open the longer it has to develop good adhesion with a substrate. Such characteristics make these adhesives ideal for shipping cases, cartons and trays during summer and winter months, for storage in warehouses where ambient temperatures can exceed 140° C., and for freezer storage where temperatures may be less than about 0° F. (about −18° C.). The combination of both superior heat resistance and longer open time gives these hot melts unique properties over the conventional hot melt packaging adhesives.

These adhesives are also characterized by specific gravities of less than about 1.00 at 23° C.

These adhesives are further characterized by viscosities of less than about 2000 cPs at 175° C., making them ideally suited for use in piston pump and gear pump extrusion type packaging equipment, as well as wheel applicators. Extrusion type application is the most commonly used method for forming and closing cases, cartons and trays where paper and paperboard are used, such as various kinds of kraft paper and paperboard, including virgin and recycled kraft, high and low density kraft and corrugated versions thereof, and chipboard, and various types of treated and coated kraft and chipboard and composites thereof. These substrates may be coated with polyethylene and polypropylene, varnishes, inks, and composites of foil and film. The extrusion type application equipment may be manufactured by Nordson, ITW, Slautterback or Mercer. These adhesives are ideally suited for high speed application where line speeds may reach 250 cartons/minute, and viscosities are constrained to less than about 1000 cPs at 175° C. Higher viscosities lead to stringing and "angel hair" build-up on the equipment. These adhesives may also be used in wheel-type application equipment where viscosities may be higher, preferably less than about 2000 cPs at 175° C.

EXAMPLES 1 AND 2, AND COMPARATIVE EXAMPLE A

TEST METHODS
1. MELT VISCOSITIES

The melt viscosities of the hot melt adhesives were determined on a Brookfield Thermosel Viscometer Model LVDV 2+ using a number 21 spindle.

2. PEEL VALUES

Peel values were determined by placing samples in a programmed oven with 100 g weights used for the peel mode, and ramping the temperature up from 25° C. to 100° C. at 25° C./hour. The oven automatically recorded the temperature at which the samples failed. Each sample was coated onto kraft paper by hand using glass rods or shims. The resultant coating is a one inch wide band that is about 8–10 mils or about 0.008 to about 0.010 inches thick. A minimum of 8 samples were run for each adhesive. The adhesives of the invention were compared to commercially available formulas.

3. BONDING TESTS

Adhesive bonds were made on various substrates using an application temperature of about 175° C., an open time of 1 second, 3 seconds, 5 seconds and 7 seconds, a set time or compression of 2 seconds, and a bead size of ⅛ inch (0.32 cm). The resulting bonds were then conditioned at about 40° F. (about 4.5° C.) for at least 24 hours, and then separated by hand and the amount of fiber tear based on a percentage was determined. A minimum of six samples were tested for each adhesive. The adhesive performance was compared to two different commercially available formulas.

The adhesive ingredients, other than the polymers, were melted in a forced air type oven between about 150° C. and 175° C. The polymer was then slowly added to the melt in what is known in the art as upright or lightening mixers such as the Stirrer Type RZRI manufactured by Caframo in Wiarton, Ontario, Canada. The blend was kept at temperatures of between about 150° C. and 175° C. using a heating mantle such as those manufactured by Glas-Col in Terre Haute, Ind. The formula was then mixed until smooth and homogeneous. The antioxidant may be added either during the melting stage, the mixing stage or during both.

TABLE 1

| Composition | Example 1 | Example 2 | Comparative Example A |
|---|---|---|---|
| EMA (21-270) | 20.0 | 20.0 | — |
| EnBA (35-400) | 15.0 | — | — |
| EnBA (35-1000) | — | 15.0 | — |
| EVA (28-400) | — | — | 24.0 |
| EVA (28-05) | — | — | 6.0 |
| Eastotac H-130R | 48.7 | 48.7 | — |
| Sylvatac 1103 | — | — | 49.7 |
| Snythetic High MP Wax | 16.0 | 16.0 | 20.0 |
| Antioxidant | 0.3 | 0.3 | 0.3 |

EMA = Ethylene Methyl Acrylate copolymer with about 21% Methyl Acrylate by weight and melt index of about 270 g/10 min.
EnBA = Ethylene n-Butyl Acrylate copolymer with about 35% n-Butyl Acrylate by weight and a melt index of about 400 g/10 min. and about 1000 g/10 min.
EVA = Ethylene Vinyl Acetate copolymer with about 28% Vinyl Acetate by weight and a melt index of about 400 g/10 min. and about 5 g/10 min.

The antioxidant used is a hindered phenolic antioxidant and examples are either Irganox™ 1010 or Irganox™ 1076 from Ciba-Geigy.

Comparative Example A is a conventional hot melt adhesive sold as a standard in the industry for case and carton sealing and for tray forming.

TABLE 2

TEST DATA

| | Heat Resistance (100 g Peel) | Freeze Temperature Bonding Performance | Bonding Performance after 24 h @ 40° F on High Performance Corrugated with an Open Time of | | | |
|---|---|---|---|---|---|---|
| | | | 1 sec Open time | 3 sec Open time | 5 sec Open time | 7 sec Open time |
| Example 1 | 153° F. | 100 | 90 | 80 | 80 | 70 |
| Example 2 | 154° F. | 100 | 90 | 70 | 40 | 40 |
| Comparative Example A | 145° F. | 70 | 75 | 25 | 30 | 10 |

Bonding performance both in the freezer and about 40° F. (about 4.5° C.) is given as percent fiber tear. A full fiber tearing bond would be 100% while 10% is minimal fiber tear.

As the examples illustrate, the adhesives of the present invention exhibit superior heat resistance as measured by the peel values, and superior bonding performance at open times of 3 seconds, 5 seconds and 7 seconds, and also exhibit superior freezer resistance over the conventional hot melt packaging adhesive. This combination of increased heat resistance and longer open times gives these hot melts unique properties over the conventional hot melt packaging adhesive.

I claim:

1. A hot melt adhesive composition, comprising:
    a) from about 10% to about 30% by weight of at least one copolymer of ethylene and methyl (meth) acrylate;
    b) from about 10% to about 20% by weight of at least one copolymer of ethylene and n-butyl (meth) acrylate;
    c) from about 20% to about 60% by weight of at least one tackifying resin selected from the group consisting of rosins and modified rosins and hydrogenated derivatives; aliphatic, cycloaliphatic and aromatic hydrocarbons and modified hydrocarbons and hydrogenated derivatives; terpenes and modified terpenes and hydrogenated derivatives; and are mixtures thereof; and
    d) from about 5% to about 30% by weight of at least one wax;
wherein the total polymer content does not exceed 45% by weight, and total ethylene n-butyl (meth) acrylate copolymer content does not exceed the total ethylene methyl (meth) acrylate copolymer content by percent weight in the adhesive and the resultant adhesive has peel values of greater than about 150° F. (65° C.).

2. The adhesive of claim 1 wherein the wax is selected from the group consisting of paraffin waxes, microcrystalline waxes, high density low molecular weight polyethylene waxes, by-product polyethylene waxes, Fischer-Tropsch waxes, oxidized Fischer Tropsch waxes, hydroxy waxes, stearamide waxes and mixtures thereof.

3. The adhesive of claim 1 made by the process comprising the steps of:
    a) melting a),b),c) and d); and
    b) blending a),b),c) and d) until smooth and homogeneous;
wherein the melting and blending of a),b),c) and d) may occur in any order of addition.

4. The adhesive of claim 1 wherein the copolymer of ethylene n-butyl (meth) acrylate has a melt index of less than about 400 g/10 minutes.

5. The adhesive of claim 1 wherein the copolymer of ethylene n-butyl (meth) acrylate comprises from about 30% to about 40% by weight n-butyl (meth) acrylate.

6. The adhesive of claim 1 wherein the adhesive comprises from about 10% to about 17% by weight ethylene n-butyl (meth) acrylate copolymer.

7. The adhesive of claim 6 wherein the ethylene n-butyl acrylate comprises from about 30% to about 40% by weight in the adhesive.

8. The hot melt adhesive of claim 1 useful for packaging applications comprising from about 15% to about 25% by weight of a copolymer of ethylene and methyl acrylate; from about 10% to about 20% by weight of a copolymer of ethylene and n-butyl (meth) acrylate; from about 40% to about 50% by weight of a tackifying resin selected from the group consisting of aliphatic, cylcoaliphatic and aromatic hydrocarbons and modified hydrocarbons and hydrogenated derivatives; and mixtures thereof; from about 10% to about 20% by weight of a Fischer Tropsch wax; and from about 0.1% to about 0.5% of a hindered phenolic antioxidant.

9. A composite, comprising:
   I. at least one substrate; and
   II. a hot melt adhesive coated on at least one surface of said substrate, comprising:
      a) from about 10% to about 30% by weight of at least one copolymer of ethylene and methyl (meth) acrylate;
      b) from about 10% to about 20% by weight of at least one copolymer of ethylene and n-butyl (meth) acrylate;
      c) from about 20% to about 60% by weight of at least one tackifying resin selected from the group consisting of aliphatic, cycloaliphatic and aromatic hydrocarbons and modified hydrocarbons and hydrogenated derivatives; terpenes and modified terpenes and hydrogenated derivatives; rosins and modified rosins and hydrogenated derivatives; and mixtures thereof; and
      d) from about 5% to about 30% by weight of at least one wax;
   wherein the total polymer content does not exceed 45% by weight, and the total ethylene n-butyl (meth) acrylate content does not exceed the total ethylene methyl (meth) acrylate content by weight of the adhesive and the resultant adhesive has peel values of greater than about 150°0 F. (about 65° C.) as measured on kraft.

10. The composite of claim 9 wherein said adhesive is extruded onto the substrate.

11. The composite of claim 9 wherein said substrate is selected from the group consisting of virgin kraft paper and paperboard, recycled kraft paper and paperboard, treated kraft paper and paperboard, coated kraft paper and paperboard, high density kraft paper and paperboard, low density kraft paper and paperboard, chipboard, and corrugated versions thereof.

12. The composite of claim 9 wherein said adhesive has a viscosity of less than about 1000 cPs at 175° C.

13. A case, carton or tray utilizing a hot melt adhesive composition comprising:
   a) from about 10% to about 30% by weight of at least one copolymer of ethylene and methyl acrylate (both acrylates and methacrylates);
   b) from about 10% to about 20% by weight of at least one copolymer of ethylene and n-butyl acrylate copolymer (both acrylates and methacrylates);
   c) from about 20% to about 60% by weight of at least one tackifying resin selected from the group consisting of rosins and modified rosins and hydrogenated derivatives; aliphatic, cycloaliphatic and aromatic hydrocarbon resins and modified hydrocarbons and hydrogenated derivatives; terpenes and modified terpenes and hydrogenated derivatives; and mixtures thereof; and
   d) from about 5% to about 30% by weight of at least one wax;
wherein the total polymer content does not exceed 45% by weight and the total ethylene (meth) acrylate copolymer content does not exceed the total ethylene methyl (meth) acrylate copolymer content by percent weight of the adhesive and the resultant adhesive has a peel values of greater than about 150° F. (65° C.) as measured on kraft.

14. The case, carton or tray of claim 13 wherein the wax in the adhesive is selected from the group consisting of paraffin waxes, microcrystalline waxes, high density low molecular weight polyethylene waxes, by-product polyethylene waxes, Fischer-Tropsch waxes, oxidized Fischer Tropsch waxes, hydroxy waxes and stearamide waxes. thereof.

15. The case, carton or tray of claim 13 wherein the adhesive comprises a copolymer of ethylene n-butyl acrylate having a melt index of less than about 400 g/10 minutes.

16. The case, carton or tray of claim 13 wherein the adhesive comprises a copolymer of ethylene n-butyl acrylate comprising from about 30% to about 40% by weight n-butyl acrylate.

17. The case, carton or tray of claim 13 wherein the adhesive comprises from about 10% to about 17% by weight of the copolymer of ethylene n-butyl acrylate.

18. The adhesive of claim 17 wherein the ethylene n-butyl acrylate copolymer comprises from about 30% to about 40% by weight n-butyl acrylate.

19. The case, carton or tray of claim 13 utilizing a hot melt adhesive comprising from about 15% to about 25% by weight of a copolymer of ethylene and methyl acrylate; from about 10% to about 20% by weight of a copolymer of ethylene and n-butyl acrylate; from about 40% to about 50% by weight of at least one tackifying resin selected from the group consisting of aliphatic, cylcoaliphatic and aromatic hydrocarbons and modified hydrocarbons and hydrogenated derivatives thereof; from about 10% to about 20% by weight of a Fischer Tropsch wax; and from about 0.1% to about 0.5% of a hindered phenolic antioxidant.

20. The adhesive of claim 1 further comprising up to about 2% by weight of an antioxdant.

* * * * *